United States Patent [19]

Wu

[11] Patent Number: 5,171,068
[45] Date of Patent: Dec. 15, 1992

[54] GOLF CART WHEEL HOLDER ASSEMBLY

[76] Inventor: Ching-Chang Wu, No. 35-1, Jih Hsin Street, Tu Chang Hsiang, Taipei Hsien, Taiwan

[21] Appl. No.: 808,732

[22] Filed: Dec. 17, 1991

[51] Int. Cl.⁵ .............................................. B60B 23/10
[52] U.S. Cl. .................................... 301/111; 301/114; 301/131; 280/DIG. 6
[58] Field of Search .................... 301/1, 111, 112, 114, 301/117, 124 R, 126, 131, 125; 16/18 R, 29, 30, 31 R, 31 A, 38, 39, 42 T, 45, 46; 280/DIG. 6, 93, 96.1, 646

[56] References Cited

U.S. PATENT DOCUMENTS

| | | | |
|---|---|---|---|
| 539,543 | 5/1895 | Ransden et al. | 16/31 |
| 1,264,434 | 4/1918 | Price | 301/126 |
| 1,832,770 | 11/1931 | Hallowell | 16/29 |
| 3,150,881 | 9/1964 | Van Skyock | 280/646 |

FOREIGN PATENT DOCUMENTS 449334  6/1936  United Kingdom ............... 16/31 A

Primary Examiner—Russell D. Stormer
Attorney, Agent, or Firm—Varndell Legal Group

[57] ABSTRACT

A golf cart wheel axle assembly having a holder plate connected to the frame of a golf cart to hold a wheel axle by a lock screw, wherein the wheel axle has a tapered rod and a rectangular block longitudinally aligned and respectively inserted into a taper hole and a rectangular hole on the holder plate; the lock screw is screwed through the tapered hole into a bolt hole on the tapered rod, having a split circular projection engaged into an annular groove inside the tapered hole.

1 Claim, 3 Drawing Sheets

GOLF CART WHEEL HOLDER ASSEMBLY

BACKGROUND AND SUMMARY OF THE INVENTION

The present invention relates to golf cart wheel holder assemblies and relates more particularly to such a golf cart wheel holder assembly which has means to secure a wheel axle against longitudinal and radial movement.

FIG. 1 illustrates a prior art golf cart wheel holder assembly which is generally comprised of a wheel holder having a socket welded thereto at the bottom for fastening a wheel axle (not shown) of a wheel by a lock screw. When the wheel axle is inserted into the socket, the lock screw is screwed into a bolt hole (not shown) on the socket to firmly secure the wheel axle in place. Because the socket is connected to the wheel holder at the bottom through the process of welding, its angle position is difficult to be precisely controlled during the process of welding. If the socket is not precisely welded to the wheel holder at the correct angle, the stability and durability of the wheel holder assembly will be unfavorably affected. Further, because the wheel axle is secured in the socket simply by a regular lock screw, the wheel axle may be vibrated to displace from position when the wheel is running over an uneven ground.

The present invention has been accomplished to eliminate the aforesaid disadvantages. It is therefore the main object of the present invention to provide a golf cart wheel holder assembly which can firmly secure the wheel axle of a wheel to the frame of a golf cart in place and which is durable in use.

According to the present invention, a golf cart wheel holder assembly is generally comprised of a wheel axle which has a rectangular block and a hollow tapered rod at one end, a holder plate which has a rectangular hole and a tapered hole aligned for fastening said wheel axle, and a lock screw which has a split circular projection on a hollow screw rod. The rectangular block and the hollow tapered rod of the wheel axle are respectively inserted into the rectangular hole and the tapered hole on the holder plate, and therefore, the wheel axle is prohibited from rotary motion. The screw rod of the lock screw is screwed through the tapered hole into a bolt hole on the tapered rod of the wheel axle to secure it in place. When the screw rod of the lock screw is screwed into a lock position to secure the wheel axle in place, the split circular projection thereof is engaged into an annular groove inside the tapered hole.

DETAILED DESCRIPTION OF THE PREFERRED EMBODIMENT

Figure 1:
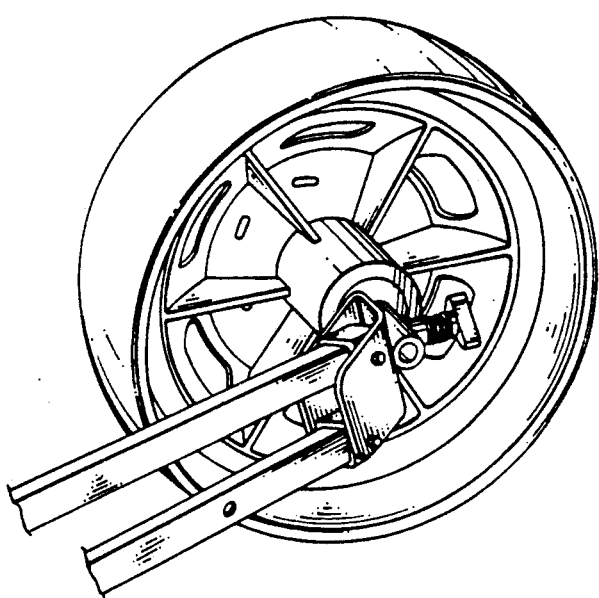
FIG. 1 is a perspective view of a golf cart wheel holder assembly according to the prior art.
Figure 2:
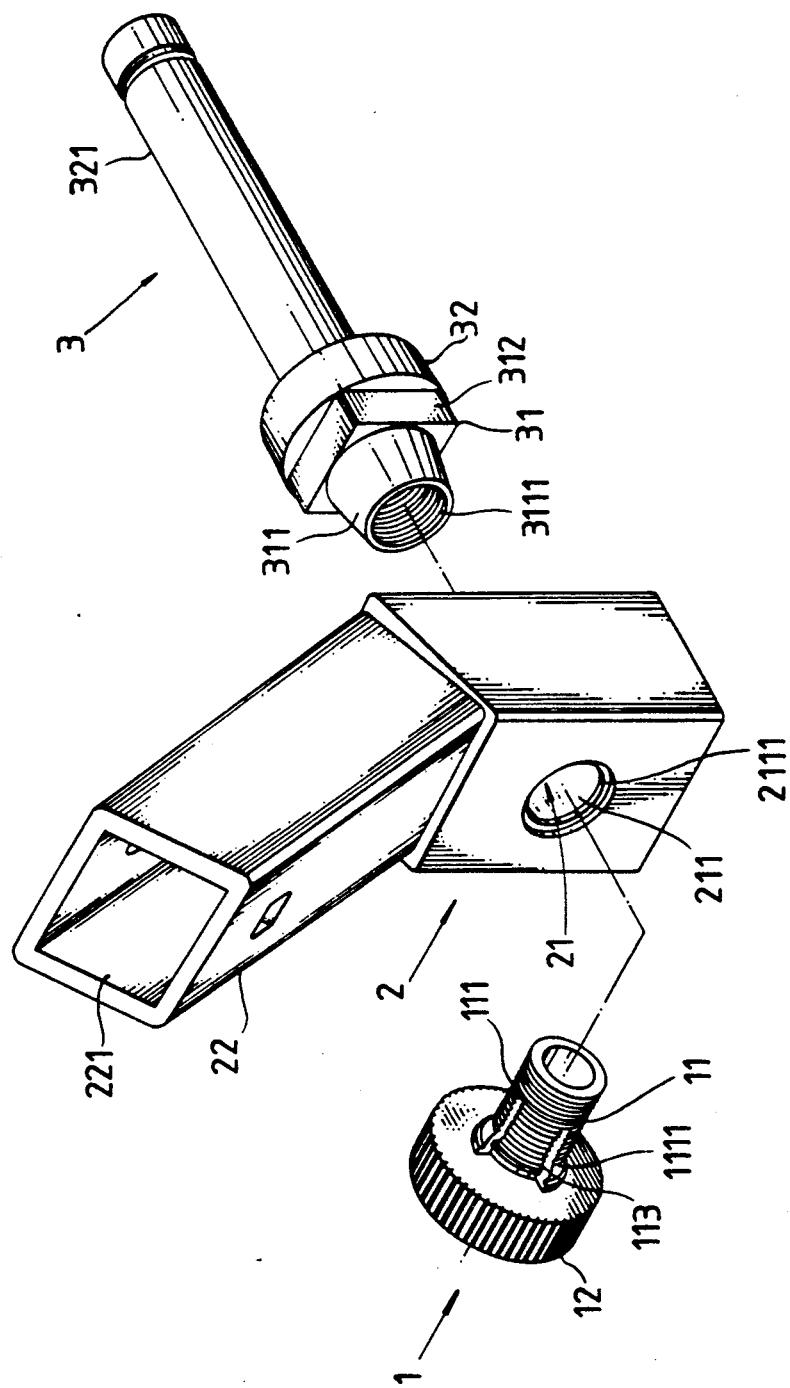
FIG. 2 is an exploded perspective view of a golf cart wheel holder assembly according to the present invention.
Figure 3:
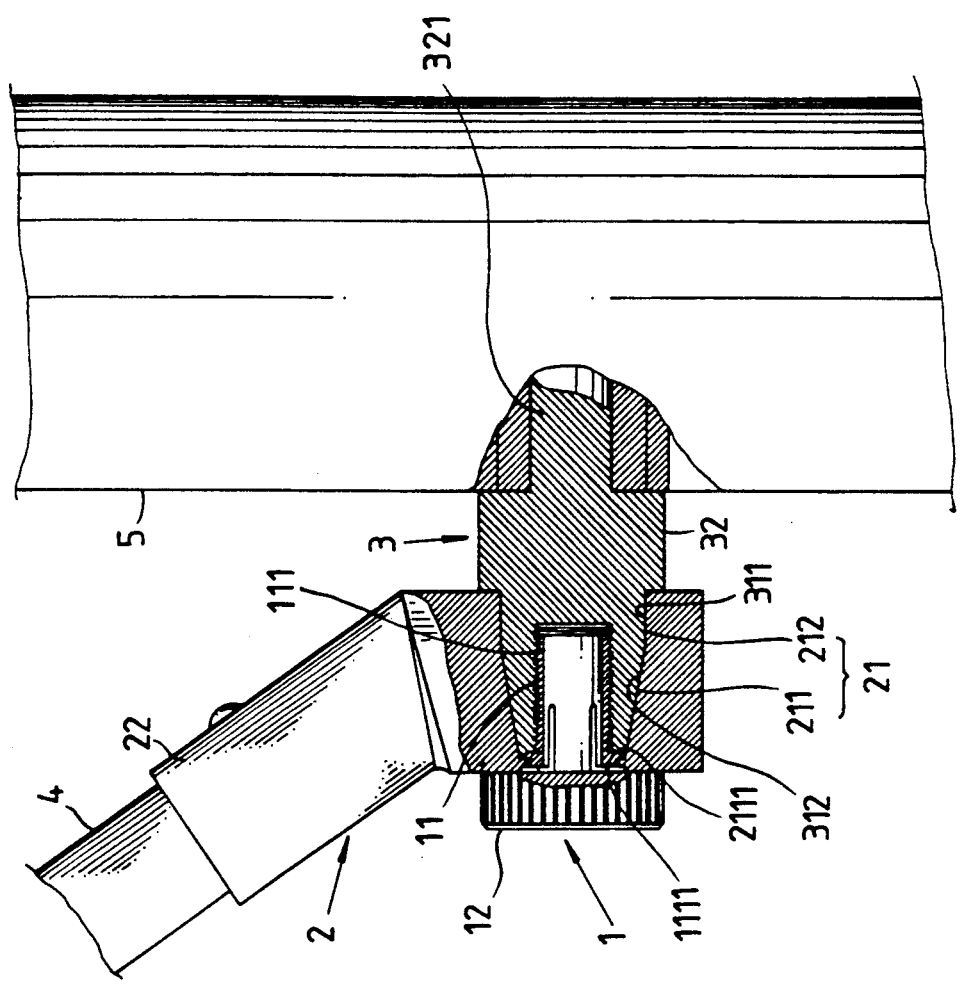
FIG. 3 is a sectional assembly view of the present invention.

Referring to FIGS. 2 and 3, a wheel holder assembly for a golf cart as constructed in accordance with the present invention is generally comprised of a holder plate 2, a wheel axle 3, and a lock screw 1, wherein said holder plate 2 is fastened in the frame of a golf cart at a suitable location for fastening said wheel axle 3 by said lock screw 1.

As illustrated, the holder plate 2 comprises a beveled sleeve 22 at the top which defines therein a hole 221 in longitudinal direction for inserting a connecting rod 4 from the frame of a golf cart, and a through hole 21 pierced therethrough in transverse direction at a lower location which is formed into a tapered hole 211 and a rectangular hole 212 disposed in line. On the inner wall surface of the tapered hole 211, there is made an annular groove 2111 for locking the lock screw 1 in a locked position. The wheel axle 3 comprises an elongated rod 321 for mounting a wheel 5, a collar 32 for supporting said wheel 5 in place, and a connecting rod 31 opposite to said elongated rod 321 for connecting to the holder plate 2. The connecting rod 31 comprises a unitary rectangular 312 adjacent to the collar 32, and a hollow tapered rod 311 extending from said rectangular block 312 and in line with said elongated rod 321, wherein said hollow tapered rod 311 has an inner thread 3111 for fastening the lock screw 1. The lock screw 1 comprises a hollow screw rod 11 extending from a toothed head 12. By means of the toothed head 12, the lock screw 1 can be easily rotated with fingers. The hollow screw rod 11 has an outer thread 111 over the outer surface thereof, a circular projection 1111 adjacent to the toothed head 12, and a plurality of spaced grooves 113 in longitudinal direction at suitable locations. By means of the arrangement of the radial grooves 113, part of the hollow screw rod 11 is made movable, and therefore, the circular projection 1111 can be moved into the annular groove 2111 when the lock screw 1 is completely screwed through the tapered hole 211 into the inner thread 3111 of the connecting rod 31.

The assembly process of the present invention is outlined hereinafter. Insert the connecting rod 31 of the wheel axle 3 into the through-hole 21 on the holder plate 2 with the tapered rod 311 and the rectangular block 312 respectively engaged into the tapered hole 211 and the rectangular hole 212. Then, insert the hollow screw rod 11 of the lock screw 1 through the tapered hole 211 into the tapered rod 311 with the outer thread 111 screwed into the inner thread 3111 permitting the circular projection 1111 to be engaged into the annular groove 2111. Because the rectangular block 312 is engaged in the rectangular hole 212, the wheel axle 3 is prohibited from rotary motion. Because the circular projection 1111 of the lock screw 1 is engaged in the annular groove 2111 in the tapered hole 211 on the holder plate 2 wheel axle 3 and the outer thread 111 of the lock screw 1 is engaged with the inner thread 3111 of the tapered rod 311 of the wheel axle 3, the wheel axle 3 is prohibited from longitudinal displacement. Therefore, once the holder plate 2 is connected to the frame of a golf cart, the wheel axle 3 becomes firmly secured in place by the lock screw 1.

I claim:

1. A golf cart wheel holder assembly for securing a wheel to a frame of a golf cart, which comprises:

a holder plate secured tot he frame of a golf cart, said holder plate having a body portion with a beveled sleeve obliquely extending upward therefrom, said beveled sleeve having a hole therein extending in a longitudinal direction thereof for receiving a connecting rod from the frame of a golf cart, said body portion including a transverse hole passing therethrough in a transverse direction relative thereto, said transverse hole being a tapered hole at one end and a rectangular hole at an opposite end, said tapered hole having an annular groove on an inner wall surface thereof;

a wheel axle fastened in said transverse hole for holding a wheel, said wheel axle including an elongated rod for mounting a wheel, a collar for supporting said wheel in place, and a connecting rod opposite to said elongated rod for fastening in said transverse hole, said connecting rod having a unitary rectangular block received in said rectangular hole, and a hollow tapered rod received in said tapered hole said hollow tapered rod having an inner thread on an inner wall surface thereof; and a lock screw inserted through said transverse hole and securing said wheel axle to said holder plate; said lock screw comprising a toothed head for rotating by fingers; a hollow screw rod screwed through said tapered hole, said hollow screw rod having an outer thread screwed into said inner thread on said tapered rod; and a split circular projection engaging said annular groove of said tapered hole.

* * * * *